United States Patent Office 3,233,195
Patented Feb. 1, 1966

3,233,195
TWO-STATE CIRCUITS
Michael Barraclough, Malvern, England, assignor to National Research Development Corporation, London, England
Filed Feb. 8, 1961, Ser. No. 87,817
Claims priority, application Great Britain, Feb. 8, 1960, 4,350/60; Nov. 18, 1960, 39,664/60
11 Claims. (Cl. 333—7)

This invention relates to two-state circuits.

There are many kinds of two state circuits; they are widely used in electronic digital calculating equipment. A large number are of the kind which have two possible levels of stable, or near stable operation; the levels are typified by the D.C. states of the circuit. A change from one state to the other is generally made by forcibly changing the circuit conditions; for example, in the case of the well-known Eccles-Jordan two-state circuit, by applying a voltage pulse to an appropriate part of the circuit.

It is often convenient to have a two-state circuit, a so-called A.C. two-state circuit in which the states are A.C. states of the circuit; the speed of operation of a circuit which responds to an A.C. pulse may be high and the effects of resonances in an A.C. two-state circuit may not be as high as in the D.C. circuit.

It is accordingly an object of the present invention to provide an A.C. two-state circuit.

According to the invention an A.C. two-state circuit comprises an A.C. transmission line which divides into two branches, two diode devices of the variable reactance type, each connected in a different branch for controlling the transmission of A.C. energy along it, and detecting means connected to each branch of the line for detecting A.C. energy in that branch, each detecting means being connected to a bias circuit of the diode device of the branch in which the other detecting means is connected, thereby to control the reactance of the device of one branch according to the signal in the other branch whereby in operation A.C. waves transmitted along one branch from the transmission line are effective in controlling the reactance of the variable reactance device of the other branch to ensure that no transmission takes place down that other branch, and two stable states are possible in each of which transmission occurs in a different branch.

Conveniently the state of the circuit may be changed by injecting an A.C. signal into the detecting means of the other branch.

A two-state circuit according to the invention may be known as an alternating current flip-flop.

Figure 1:
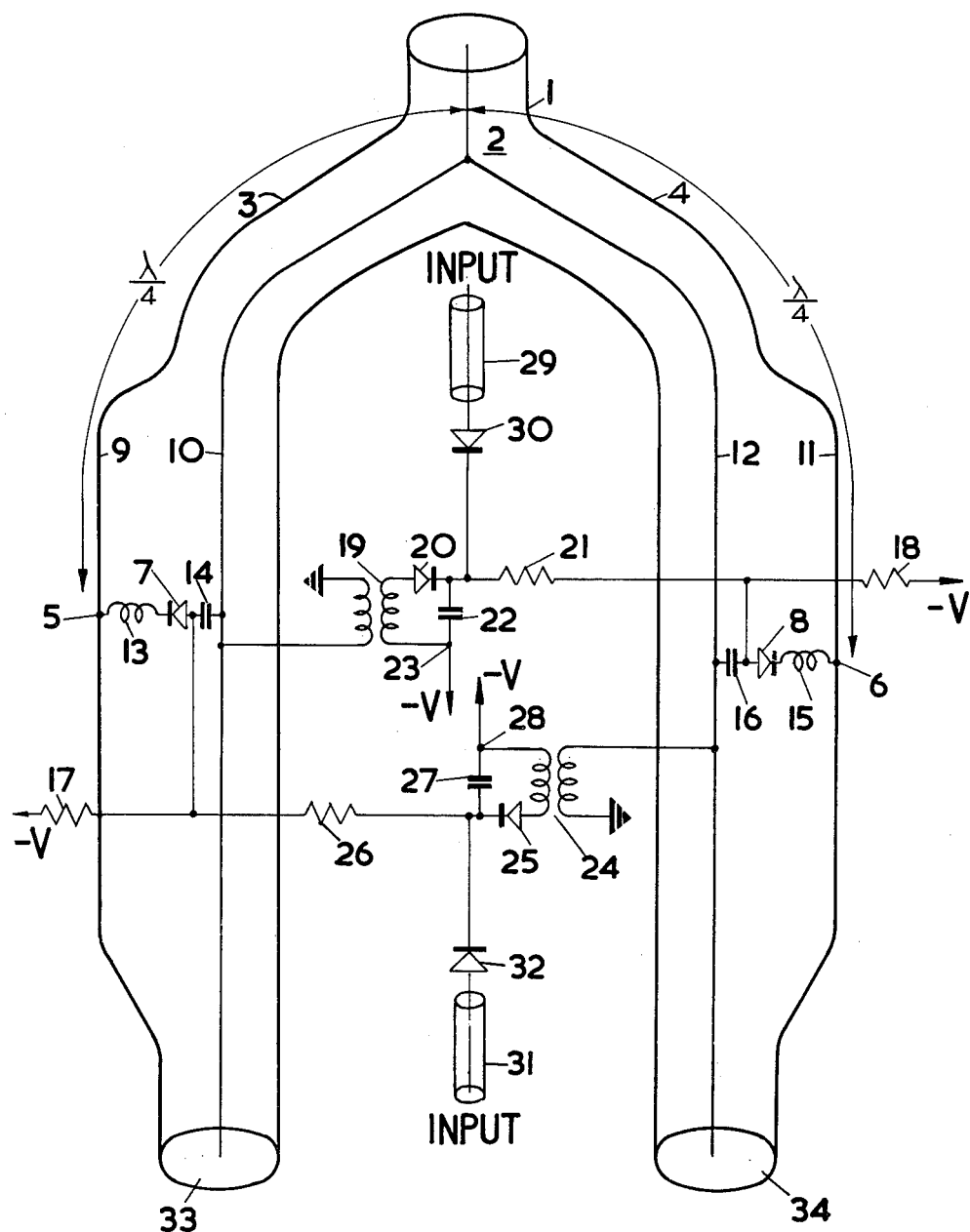
Figure 2:
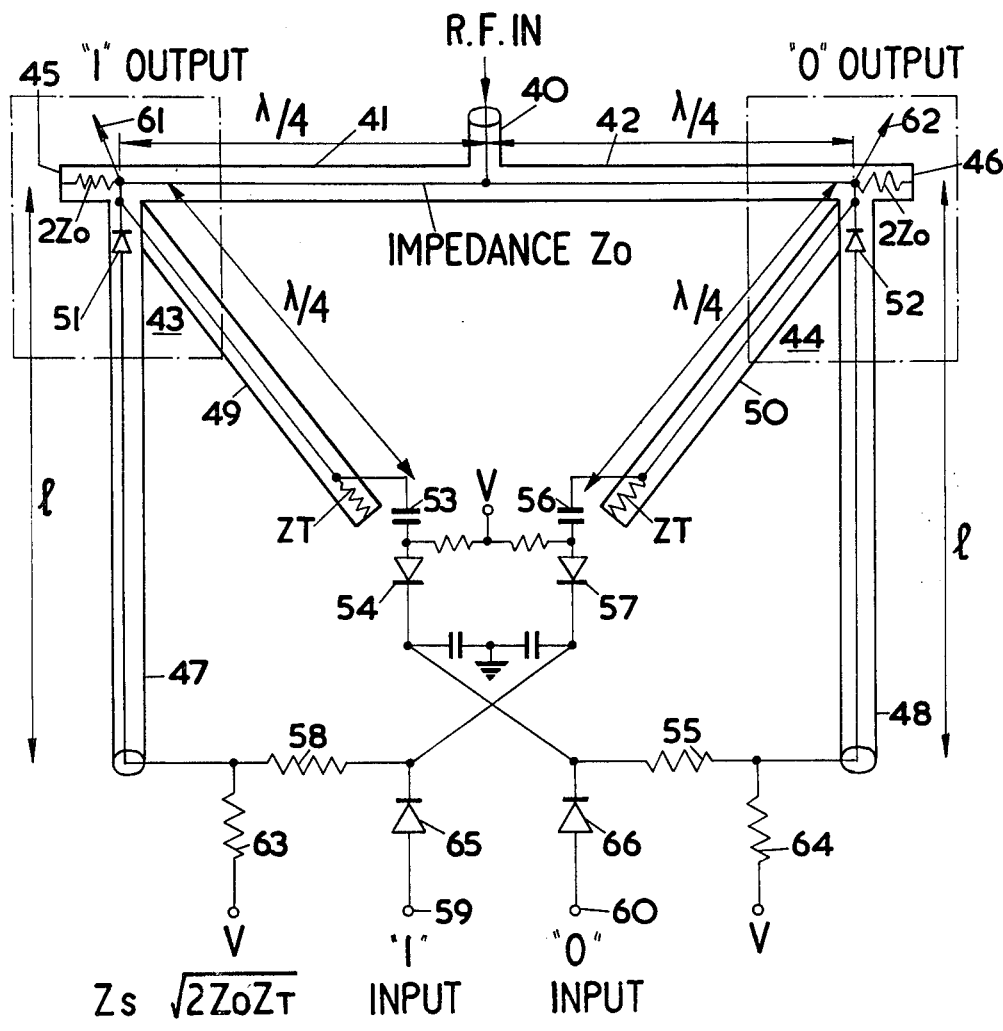

Examples of the circuit of the invention will now be described reference being made to the accompanying drawings in which:

FIG. 1 shows schematically one arrangement of an alternating current flip-flop, and FIG. 2 shows schematically another arrangement for operation at higher radio frequencies.

A coaxial transmission line 1 divides at a point 2 into two branches 3 and 4. A quarter-wavelength along the branches 3 and 4 from the point 2 at points 5 and 6 respectively variable reactance diodes 7 and 8 are connected across the coaxial conductors 9 and 10, and 11 and 12 of the branches 3 and 4 respectively. An inductance 13 and a capacitor 14 are connected in series with the diode 7 and similarly an inductance 15 and a capacitor 16 are connected in series with the diode 8. The diodes 7 and 8 are biased so that they are in the non-conducting state by connections to negative voltage sources via resistors 17 and 18 respectively; the circuit is arranged so that the series impedance across the coaxial conductors is high at the operating frequency.

A transformer 19 in series with a diode 20 and a resistor 21 provides one cross-connection path between the branch 3 and the variable reactance diode 8. The primary of the transformer 19 is earthed at one end and connected to the conductor 10 of the branch 3; the resistor 21 is connected to the bias connection of the diode 8. A capacitor 22 shunts the secondary of the transformer 19 in series with the diode 20 and a connection to a bias voltage source is made at a point 23.

A correspondingly similar cross-connection is provided between the conductor 12 of the branch 4 and the variable reactance diode 7 and consists of a transformer 24, a diode 25, a resistor 26, a capacitor 27; a connection to a bias voltage source is provided at a point 28.

A first input circuit for an A.C. setting signal comprises a coaxial feeder 29 connected in series with a diode 30 to the junction of the capacitor 22 and the diode 20. A second input circuit comprises a coaxial feeder 31 connected in series with a diode 32 to the junction of the capacitor 27 and the diode 25.

For convenience the outlets of the coaxial line branches 3 and 4 are designated 33 and 34 respectively.

In operation an alternating current signal is fed into the coaxial line 1 and tends to divide into the branches 3 and 4. For convenience however we will consider only the signal proceeding along the branch 3. This signal is transformed to a higher voltage by the transformer 19, detected by the diode 20 and applied as a D.C. bias to the variable reactance diode 8. The diode 8 in series with the capacitor 16 and the inductance 15 shunts the branch 4 with the result that when the D.C. bias is applied to it its capacitance is increased and a short-circuit exists across the branch 4; no path for A.C. signals exists along the branch 4. Thus once an A.C. signal has been established in the path 3 a stable condition is set up which will continue in the absence of outside influences. Similarly, once an A.C. signal has been established in the path 4 a second stable condition is set up. There are therefore two stable states of the circuit, one where an A.C. signal is present at the outlet 33 of the branch 3 and nothing at the outlet 34 and the other where an A.C. signal is present at the outlet 34 of the branch 4 and nothing at the outlet 33.

If we now consider further the state in which the branch 3 is feeding an A.C. signal to the outlet 33 we see that an A.C. input signal applied to the coaxial feeder 31 changes the bias conditions of the variable reactance diode 7 which thereupon effects a short circuit across the branch 3. The feed to the transformer 19 from the branch 3 is then inhibited so that the extra bias on the diode 8 is removed and the impedance across branch 4 returns to its normal high level and an A.C. signal then passes along the branch 4. This A.C. signal then controls the bias conditions of the diode 7 in the branch 3 via the transformer 24. In other words the second stable state is set-up in which an A.C. signal is present at the outlet 34.

An A.C. signal input to the coaxial feeder 29 has the opposite effect and reverses the state of the circuit so that an A.C. signal is once again present at the outlet 33.

The circuit described constitutes an alternating current flip-flop and although in the example described a coaxial type tranmission line is employed it is to be understood that transmission lines of other types may be used. For example two-wire lines, strip transmission lines and waveguide are all suitable. And, according to the transmission line used so the frequency of operation may be chosen within a very wide range from kilocycles to kilomegacycles. In this connection it is noted that the transformers of the cross-connections from each branch are designed to provide a transformation ratio which gives a sufficiently high cross-biassing voltage for the variable reactance diode of the other branch; this biasing voltage is derived from the A.C. signal fed to the transformer from the branch. The power necessary to provide the biassing voltage is much less than the power going along the branch.

The enlargements of the branches 3 and 4 are determined only by considerations of accommodating the variable reactance diodes and their associated components shunting the lines; and may even prove not to be necessary in many cases.

The two-state circuit of the arrangement of FIG. 2 is intended for use at the higher radio frequencies of the order of 10 kmc./s. in contrast to that described with reference to FIG. 1 which operates at lower radio frequencies.

An input coaxial line 40 divides into quarter-wavelength sections 41, 42 of characteristic impedance $Z_o$. At the end of the sections 41, 42 four-way co-axial joints 43, 44 provide feeds for terminated sections of line 45, 46, inductive sections of line 47, 48 and further quarter wavelength sections of line 49, 50. The characteristic impedance of the coaxial lines is taken to be $Z_o$. The inductive sections 47, 48 are between $\lambda/4$ and $\lambda/2$ long and carry variable capacitance diodes 51, 52. Bias for these diodes 51, 52, is supplied by a voltage $-V$ via resistors 63, 64.

A first cross-coupling circuit comprising a capacitor 53 and a rectifier 54 is connected from the quarter wavelength section 49, whose impedance is $Z_s$, to the end of the inductive section 48 via a resistor 55. Similarly a second cross-coupling circuit 56, 57, 58 connects from the quarter wavelength section 50 (impedance $Z_s$) to the end of the inductive section 47.

Trigger input terminals 59, 60 feed via rectifiers 65, 66 to the resistors 58, 55 of the cross-connection circuits, terminal 59 providing an input for the "1" input trigger and terminal 60 for the "0" input trigger.

In operation transmission paths formed by the arms 41, 47 and 42, 48 of the circuit are controlled by means of the variable capacitance diodes 51, 52 which are themselves controlled in accordance with A.C. signals, (a) fed to the cross-coupling circuits from opposite arms via the quater wavelength sections 49, 50, or
(b) fed to the input terminals 59 or 60 for switching the circuit to the "1" state or the "0" state.

The rectifiers 54, 57, 65, 66 provide D.C. signals from input A.C. signals to control the capacitance of the diodes 51, 52. For example when the circuit is in the "0" state the R.F. energy will be directed along the co-axial line 42 and an output will appear at the wire 62. An A.C. signal will be applied to the rectifying diode 57 from the arm 50 via the capacitor 56 and the voltage of the terminal remote from the arm 50 of the diode 57 will rise. This voltage rise will be communicated to the diode 51 increasing its capacity and presenting the co-axial line 41 with a series tuned circuit consisting of the capacitance of the diode 51 and the inductance of the line 47. This has the effect of a short-circuit at the coupling 43 which appears as an open-circuit at the junction between the lines 40, 41 and 42, because the line 41 is a quarter wavelength line. On a switching pulse being applied to the "1" input terminal 59, the circuit changes over with the R.F. energy being directed along the co-axial line 41 instead of the co-axial line 42. The impedance of the co-axial line is matched at the coupling 43 by the terminated section of line 45 (impedance $2Z_o$) and the quarter wavelength section 49 (impedance $2Z_o$).

Outputs denoting the state of the circuit are obtained at points 61, 62 conveniently provided at the couplings 43, 44.

What I claim is:

1. An A.C. two-state circuit comprising an A.C. transmission line which divides into two branches, two diode devices of the variable reactance type, each having a respective bias circuit and being connected in a different branch for controlling the transmission of A.C. energy along it, and two detecting means one connected to each branch of the line for detecting A.C. energy in that branch, each detecting means being further connected to a bias circuit of the diode device of the branch in which the other detecting means is connected for controlling the reactance of the device of one branch according to the presence and absence of a signal in the other branch, whereby in operation A.C. waves transmitted along one branch from the transmission line are themselves effective in controlling the reactance of the variable reactance device of the other branch to ensure that no transmission takes place down that other branch, and two stable states are possible in each of which transmission occurs in a different branch.

2. An A.C. two-state circuit as claimed in claim 1, wherein the branches are coaxial transmission lines and the detecting means of each branch comprises a rectifier connected in circuit between the branch and the reactance diode device of the other line.

3. An A.C. two-state circuit as claimed in claim 2, and further including inputs for state determining signals comprising individual input connections to the bias circuits of the reactance diode devices and rectifying means connected in series with each input.

4. An A.C. two-state circuit as claimed in claim 1 wherein the transmission line and the two branches comprise coaxial lines and each diode device is connected across a different branch line in series with a series impedance at a point an odd number of quarter-wavelengths along the branch from where the transmission line divides, the impedance of each series connection at transmission frequency across a branch line being low when the diode device is controlled by a transmission in the other branch and high in the absence of a transmission in that other branch.

5. An A.C. two-state circuit as claimed in claim 4, wherein the detecting means is connected to its branch by means of a two-winding transformer.

6. An A.C. two-state circuit as claimed in claim 1 wherein the transmission line and the two branches comprise coaxial lines, each branch comprising a section an odd number of quarter-wavelengths long feeding from where the transmission line divides to a coaxial joint, a matched terminated section connected to the joint, and a reactive section connected to the joint and having one of the variable reactance diode devices connected in series therewith, the arrangement being such that the impedance of the reactive section and its diode device at the coaxial joint being low when the diode device is controlled by a transmission in the other branch and high in the absence of a transmission in that other branch.

7. An A.C. two-state circuit as claimed in claim 6, wherein the reactive section of the branch is an inductive length of line.

8. An A.C. two-state circuit as claimed in claim 7, wherein a quarter-wavelength coaxial line transformer having a matched termination is connected to the coaxial joint and the detecting means is connected at its terminated end.

9. An A.C. two-state circuit comprising an A.C. transmission line which divides into two branches, two variable reactance devices, each having a respective bias circuit and being connected in a different branch for controlling the transmission of A.C. energy along it, and two detecting means connected one to each branch of the line for detecting A.C. energy in that branch, each detecting means being further connected to the bias circuit of the reactance device of the branch in which the other detecting means is connected for changing the reactance of the device of one branch in response according to the presence of a signal in the other branch, whereby in operation A.C. waves transmitted along one branch from the transmission line are themselves effective in controlling the reactance of the variable reactance device of the other branch to ensure that no transmission take place down that other branch, and two stable states are possible in each of which transmission occurs in a different branch.

10. A circuit as in claim 9 in which each of the said variable reactance devices has a variable capacitance characteristic.

11. A circuit as in claim 10 wherein each of the said variable capacitance devices is connected in a series inductance capacitance circuit in its respective branch of the said transmission line.

References Cited by the Examiner
UNITED STATES PATENTS

| | | | |
|---|---|---|---|
| 2,439,651 | 4/1948 | Dome | 333—7 |
| 2,829,279 | 4/1958 | Doleman | 307—88.5 |
| 2,879,409 | 3/1959 | Holt | 307—88.5 |

JOHN W. HUCKERT, *Primary Examiner.*

RUDOLPH V. ROLINEC, ARTHUR GAUSS,
*Examiners.*